No. 799,608. PATENTED SEPT. 12, 1905.
J. W. LINZEE, Jr.
PIPE COUPLING.
APPLICATION FILED MAY 5, 1905.

2 SHEETS—SHEET 1.

Witnesses:
P. W. Pezzetti
L. E. Kennedy

Inventor:
J. W. Linzee, Jr.
by Wright, Brown, Quinby & Sway
Attorneys.

No. 799,608. PATENTED SEPT. 12, 1905.
J. W. LINZEE, Jr.
PIPE COUPLING.
APPLICATION FILED MAY 5, 1905.
2 SHEETS—SHEET 2.
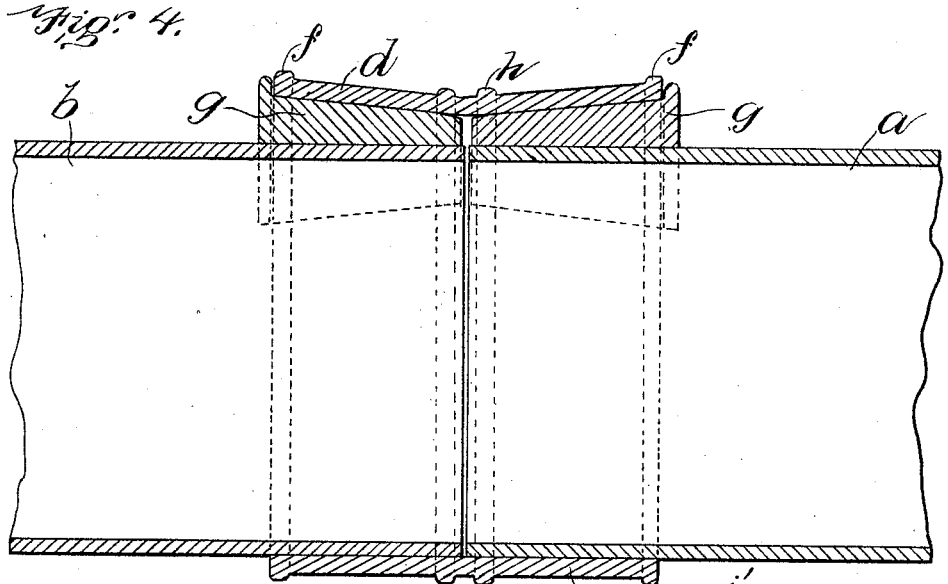
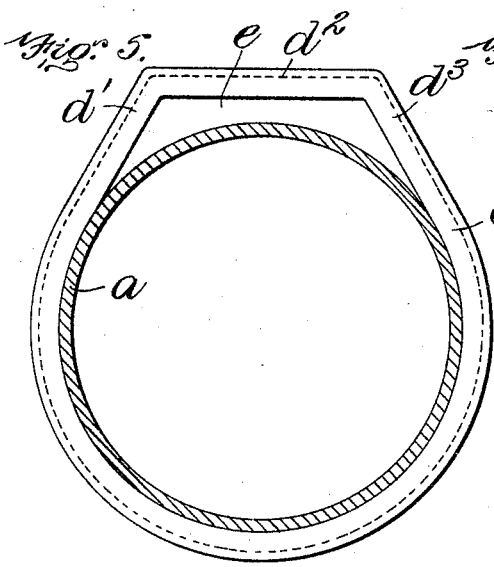
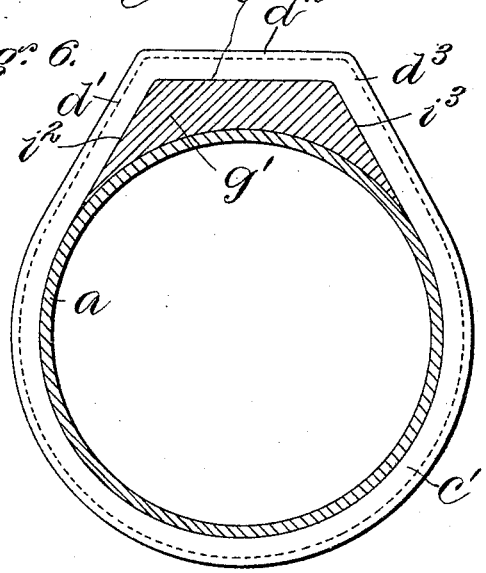

UNITED STATES PATENT OFFICE.

JOHN W. LINZEE, JR., OF BOSTON, MASSACHUSETTS.

PIPE-COUPLING.

No. 799,608.      Specification of Letters Patent.      Patented Sept. 12, 1905.

Application filed May 5, 1905. Serial No. 258,967.

*To all whom it may concern:*

Be it known that I, JOHN W. LINZEE, Jr., of Boston, in the county of Suffolk and State of Massachusetts, have invented certain new and useful Improvements in Pipe-Couplings, of which the following is a specification.

This invention has for its object to provide a device by which sections of pipes of various kinds when placed end to end may be securely united together more rapidly than heretofore and without the use of so many parts as in devices hitherto used, also without the necessity of forming screw-threads upon the ends of the pipe-sections.

Figure 1:
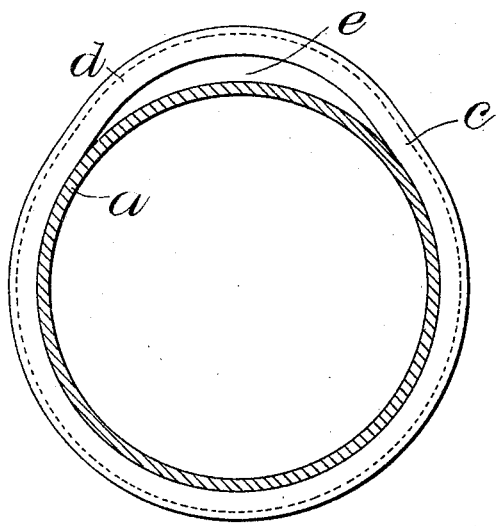
Figure 2:
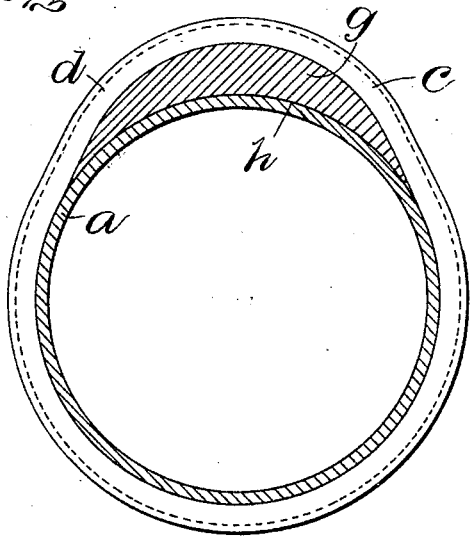
Figure 3:
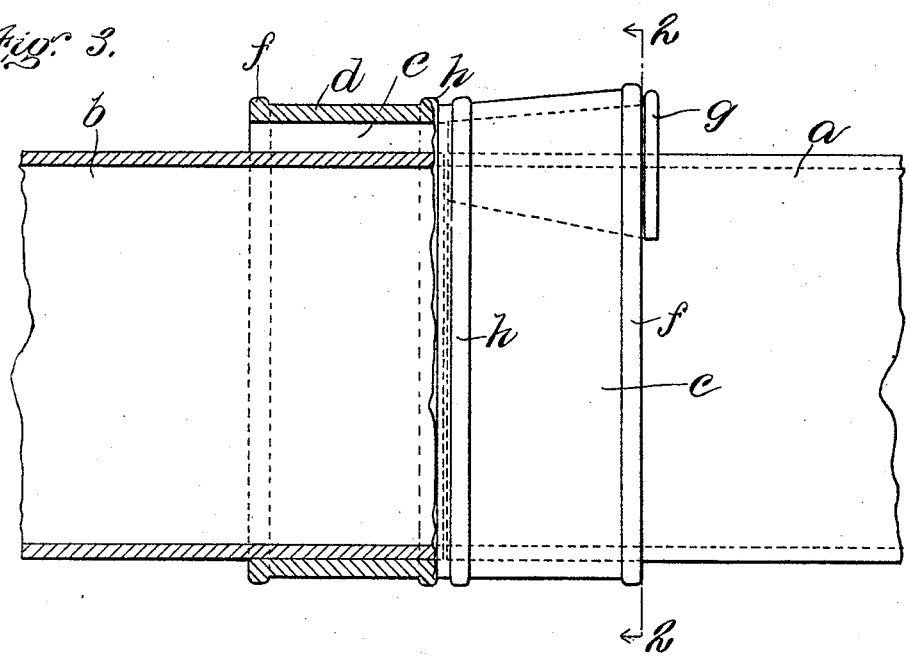

Of the accompanying drawings, Figure 1 represents a sectional view of a conduit-pipe, showing in elevation the pipe-coupling. Fig. 2 represents a similar view, but after the securing-wedge has been put in place, the section being taken on line 2 2 of Fig. 3. Fig. 3 represents a side elevation, partly in section, of the same. Fig. 4 represents a longitudinal section. Figs. 5 and 6 represent views similar to Figs. 1 and 2, showing a modified form of coupling.

The same reference characters indicate the same parts in all the figures.

$a$ and $b$ represent two sections of pipe forming a conduit of any character whatsoever which are placed end to end, and $c$ represents the principal portion of the coupling, consisting of a sleeve which is shaped to fit about the abutting pipe-sections and to extend partly over each. The sleeve is generally cylindrical and fits closely about the pipe-sections throughout the greater part of its circumferential extent, but at one side is formed with an eccentric portion $d$, which is somewhat separated from the periphery of the pipe-sections, leaving between itself and them a space $e$. The sleeve $c$ is made of ductile material, such as wrought-iron or malleable cast-iron, and is preferably, though not necessarily, formed with beads $f$, surrounding its ends or edges.

$g$ represents wedge-blocks, each of which is formed with one of its surfaces $h$ concave and cylindrical, so as to fit either pipe-section, while its outer surface is convex and of a shape corresponding generally to the interior of the eccentric part $d$ of the coupling-sleeve. Thus the wedge-blocks in section are approximately of a crescent-like shape and taper longitudinally in thickness.

In attaching the pipe-coupling the sleeve is placed about the pipe-sections, and the wedges $g$ are then driven into the spaces $e$ from the opposite ends of the sleeve, their tapering outer surfaces $i$ pressing outwardly against the eccentric part $d$ of the sleeve and distorting the same, causing the portions of the edges of the sleeve immediately above the wedges to be forced away from the pipes, while the central part of the sleeve is hardly changed at all in shape, and drawing the beads $f$ tightly about the pipe-sections, causing them to take a firm vise-like grip and at the same time drawing the wedges tightly against those parts of the pipe-sections with which they are in contact.

In the form of coupling shown in Figs. 5 and 6 the sleeve $c'$ has an eccentric part $d'$, which instead of being curved has a plane side $d^2$, which is joined with the curved portion by tangent sides $d^3$, which form angles with the side $d^2$. The wedges $g'$ are formed with plane exterior surfaces $i'$, $i^2$, and $i^3$, corresponding in shape to the formation of the eccentric part $d'$ of this form of sleeve. Additional beads $h$, which may be omitted, if desired, and of which there may be one or any other desired number, are formed on the sleeve intermediate its ends and preferably near its mid-portion. These beads, on account of their power of resistance, cause the intermediate part of the sleeve, particularly that surrounding the ends of the pipe-sections, to be drawn tightly against the sections, distributing the pressure and producing a more even pressure of all parts of the wedges on the pipe by varying the strength of the band.

It will be evident that by the present invention I have provided a coupling which requires fewer and simpler parts than does any of the wedge-couplings now known to me and in which, since the wedging force acts with the greatest effort on the ends of the coupling-sleeve, the latter are drawn with exceptional tightness about the sections of conduit to hold them in a firm unyielding grip.

I claim—

1. A coupling for connecting the ends of pipe-sections, consisting of a sleeve of ductile material shaped to surround and fit throughout the greater part of its extent, the ends of the sections and having a portion of its periphery separated from the sections, and a block having its surfaces formed to correspond respectively to the exterior of the pipe-sections and the interior of the sleeve at its separated portion, the block being longitudinally tapered in thickness, or wedge-shaped, and being driven between the end of the sleeve and the pipe, the sleeve being thereby distorted and drawn into close frictional engagement with the pipe-sections.

2. A coupling for connecting pipe-sections placed end to end, consisting of a sleeve of ductile material, surrounding the ends of two adjacent sections, shaped throughout the greater part of its circumferential extent to fit said sections and formed with an eccentric offset portion, and a wedge-block formed on its inner side to fit the pipe-section and on its outer side to fit the interior of said offset portion and arranged to distort the end of the latter and draw its edge tightly around the pipe.

3. A coupling for connecting pipe-sections placed end to end, consisting of a sleeve of ductile material, surrounding the ends of two adjacent sections, shaped throughout the greater part of its circumferential extent to fit said sections and formed with an eccentric offset portion, and a tapered block formed to correspond respectively to the exterior of the pipe-section and the interior of the sleeve, said block being arranged with its thinner portion located in the space between the pipe-section and the offset portion of said sleeve in the intermediate portion of the sleeve and its thick portion beneath the end thereof whereby the latter is distorted and drawn tightly about the pipe.

In testimony whereof I have affixed my signature in presence of two witnesses.

JOHN W. LINZEE, JR.

Witnesses:
C. F. BROWN,
A. H. BROWN.